(12) United States Patent
Hung (10) Patent No.: US 9,696,080 B2
(45) Date of Patent: Jul. 4, 2017

(54) COMPOSITE BUBBLE-TYPE SNOWFLAKE MAKER

(71) Applicant: ANTARI LIGHTING & EFFECTS, LTD., Taoyuan (TW)

(72) Inventor: Ping-Fa Hung, Taoyuan (TW)

(73) Assignee: Antari Lighting & Effects, Ltd., Taoyuan (TW)

( * ) Notice: Subject to any disclaimer, the term of this patent is extended or adjusted under 35 U.S.C. 154(b) by 0 days.

(21) Appl. No.: 15/052,936

(22) Filed: Feb. 25, 2016

(65) Prior Publication Data

US 2017/0122641 A1    May 4, 2017

(30) Foreign Application Priority Data

Oct. 30, 2015   (TW) .............................. 104135697 A (51) Int. Cl.
   *F25C 3/04*    (2006.01)
   *A63J 5/02*    (2006.01)
   (Continued)

(52) U.S. Cl.
   CPC ................ *F25C 3/04* (2013.01); *A01G 15/00* (2013.01); *A63J 5/028* (2013.01); *E03C 1/084* (2013.01); *F25C 2303/046* (2013.01)

(58) Field of Classification Search
   CPC ....... F25C 3/04; F25C 2303/046; A63J 5/028; A01G 15/00; E03C 1/084; A62C 99/0018
   (Continued)

(56) References Cited

U.S. PATENT DOCUMENTS 2,571,069 A * 10/1951 Shearman ............... A63J 5/028
                                                     239/211
3,601,313 A *  8/1971 Berg ....................... A01G 15/00
                                                     239/2.1
(Continued)

FOREIGN PATENT DOCUMENTS

GB            2481615 A        1/2012

*Primary Examiner* — Steven J Ganey
(74) *Attorney, Agent, or Firm* — Juan Carlos A. Marquez; Marquez IP Law Office, PLLC (57) ABSTRACT

Disclosed is a composite bubble-type snowflake maker, including: a main machine, an air pipe, and a sprayer. The interior of a machine body of the main machine is provided with accommodating space, so as to enable a blower to send out wind power towards an air outlet, and enable a pump to outwardly transport bubble water along a bubble water pipe. An inlet of the air pipe is connected to the air outlet, so as to enable an outlet to be far away from the main machine, and a tail end of the bubble water pipe extends outwardly along the air pipe, so as to be connected to a bubble head. One end of a sprayer body of the sprayer is connected to the outlet of the air pipe, and the other end is provided with an air outlet pipe and a plurality of air outlet holes at an outer circumference of the air outlet pipe. A tail end of the air outlet pipe is sleeved with a cloth sleeve extending outwardly, and the bubble head of the bubble water pipe is disposed in the air outlet pipe, so as to outwardly deliver the bubble water. Wind power generated by the blower is blown to the interior and exterior of the cloth sleeve through the air pipe and the sprayer body, so that the bubble water exudes from a surface of the cloth sleeve to form bubbles, and the wind power is used to blow the bubbles to fly away, so as to form artificial snowflakes.

10 Claims, 12 Drawing Sheets

(51) Int. Cl.
*A01G 15/00* (2006.01)
*E03C 1/084* (2006.01)

(58) Field of Classification Search
USPC ............. 239/2.1, 2.2, 14.1, 14.2, 211, 419.5, 239/428.5; 169/11, 15; 62/69, 74; 40/410
See application file for complete search history.

(56) References Cited

U.S. PATENT DOCUMENTS

| | | | | |
|---|---|---|---|---|
| 4,836,452 A | * | 6/1989 | Fox ...................... | B05B 7/0012 239/14.1 |
| 2004/0056110 A1 | * | 3/2004 | Guerra .................... | A63J 5/028 239/2.2 |
| 2012/0286059 A1 | * | 11/2012 | Willett .................... | A63J 5/028 239/14.2 |
| 2014/0124592 A1 | * | 5/2014 | Quee ........................ | F25C 3/04 239/14.2 |

* cited by examiner

COMPOSITE BUBBLE-TYPE SNOWFLAKE MAKER

BACKGROUND OF THE INVENTION

1. Field of the Invention

The present invention relates to a bubble-type snowflake maker, and more particularly to a composite bubble-type snowflake maker that uses wind power for blowing.

2. Description of the Related Art

A scenario such as drama and stage is used as an example, and the scenario uses, when necessary, a bubble-type snowflake maker to produce flying artificial snowflakes in the background, so as to improve dramatic and stage effects. Currently, components such as a blower and a pump are provided in a machine body of a bubble-type snowflake maker, so as to use the pump to feed bubble water, and then use the blower to blow, by using wind power, bubbles to fly away to form artificial snowflakes, thereby making a scenario of flying artificial snowflakes.

However, in a practical operation of a conventional bubble-type snowflake maker, a motor and a fan of a blower produce phenomena such as sound, vibration, and acoustic resonance, thus producing strong noise and reducing dramatic and stage performance effects. Moreover, a combined structure of the machine body of the bubble-type snowflake maker is lack of a waterproof function. Therefore, when the bubble-type snowflake maker is used in an outdoor stage, weather, surrounding environment, and human factors need to be taken into consideration, so as to prevent a failure or a damage of the bubble-type snowflake maker or even a personal injury event caused by water or rain entering the machine body. Therefore, how to solve the aforementioned problems is the subject that needs to be studied by persons skilled in the art.

SUMMARY OF THE INVENTION

A primary objective of the present invention is that a bubble-type snowflake maker uses an air pipe to connect a main machine and a sprayer, so that the main machine and the blower thereof can be far away from drama and stage sites, thereby preventing noise produced by the blower from affecting a stage performance effect.

A secondary objective of the present invention is that the sprayer of the bubble-type snowflake maker can be far away from the main machine, so as to be used in the drama and stage sites; the sprayer is suitable for an outdoor stage; and it is easier for the main machine to be far away from outdoor rain and to be applied with a waterproof measure, so as to prevent the rain from causing a failure or a damage of the main machine.

To achieve the objectives disclosed above, the composite bubble-type snowflake maker of the present invention includes: a main machine, the interior of a machine body of the main machine being provided with accommodating space for disposing a blower including a motor and a fan, so as to enable the blower to send out wind power towards an air outlet, and for disposing a pump connected to a bubble water pipe, so as to enable the pump to outwardly transport bubble water along the flexible bubble water pipe; an air pipe, an inlet at one end thereof being connected to the air outlet, an outlet at the other end being far away from the main machine, and a tail end of the bubble water pipe being outwardly far away from the main machine along the flexible air pipe, so as to be connected to a bubble head; and a sprayer, including: a sprayer body having an inner channel, an air inlet at one end of the channel of the sprayer body being connected to an outlet of the air pipe, and the other end thereof being provided with an air outlet pipe and a plurality of air outlet holes at an outer circumference of the air outlet pipe, a tail end of the air outlet pipe being sleeved with a cloth sleeve extending outwardly, and the bubble head of the bubble water pipe being disposed in the air outlet pipe.

In the aforementioned composite bubble-type snowflake maker, the pump is disposed in the machine body of the main machine, and the bubble water pipe enters an inlet of the air pipe, so that the bubble water pipe extends into the air pipe and the channel of the sprayer body.

In the aforementioned composite bubble-type snowflake maker, a pipe joint is provided between the air outlet of the blower and the inlet of the air pipe, and the pipe joint has a radial hole, so that the bubble water pipe enters the pipe joint and the air pipe through the radial hole.

In the aforementioned composite bubble-type snowflake maker, one end of the channel of the sprayer body is provided with a male connector; the outlet of the air pipe is provided with a female connector; and the female connector may be socketed into, attached to, or detached from the male connector.

In the aforementioned composite bubble-type snowflake maker, an annular groove is provided at an outer periphery of the male connector; either side of the female connector is connected to a clamping handle; and each clamping handle is provided with a protruded portion that can abut against the annular groove.

In the aforementioned composite bubble-type snowflake maker, a pipe joint that may be attached or detached is provided at a position near the tail end of the bubble water pipe.

In the aforementioned composite bubble-type snowflake maker, the other end of the sprayer body is connected to a spray pipe having an inner pipe, so as to be in communication with the air outlet holes of the corresponding channel of the sprayer body, and the air outlet pipe and the cloth sleeve extend into the pipe.

In the aforementioned composite bubble-type snowflake maker, the inner diameter of the pipe of the spray pipe is greater than that of the air outlet pipe of the sprayer body, and an inner annular toothed edge entering the inner diameter of the pipe radially extends along a tail end of the spray pipe.

In the aforementioned composite bubble-type snowflake maker, the inner annular toothed edge of the spray pipe has a plurality of annularly arranged and connected inner sharp teeth.

In the aforementioned composite bubble-type snowflake maker, an external side of the sprayer body is connected to a fixation rack.

BRIEF DESCRIPTION OF THE DRAWINGS

The invention will be described according to the appended drawings in which.

PREFERRED EMBODIMENT OF THE PRESENT INVENTION

The technical means used in the present invention for achieving the aforementioned objectives and effects thereof are described below by using feasible embodiments as examples and referring to drawings.

First, referring to FIG. 1 to FIG. 6, it can be clearly seen from the figures that a composite bubble-type snowflake maker of the present invention includes a main machine 1, an air pipe 4, and a sprayer 5, where:

a machine body 11 of the main machine 1 is provided with an air inlet 13 and a handle 14; the interior of the machine body 11 is provided with accommodating space 12 (referring to FIG. 2) for disposing a blower 2 including a housing 21, a motor 22, a power cable 221, and a fan 23; and a housing wall 211 at one side of the housing 21 is provided with a plurality of air inlet holes 24, and a housing wall 212 at the other side is provided with an air outlet 25, an air outlet pipe 26, and air outlet holes 27, so as to enable the blower 2 to send out wind power towards the air outlet 25. The interior of the machine body 11 is provided with a pump 3 connected to a bubble water pipe 31, so as to enable the pump 3 to outwardly transport bubble water 32 along the flexible bubble water pipe 31.

An inlet 41 at one end of the air pipe 4 is connected to the air outlet 25, and an outlet 42 at the other end is far away from the main machine 1; a pipe joint 43 is provided between the air outlet 25 and an inlet 41 of the air pipe 4, and is positioned by using a screw 44 to screw through holes 251, 431 (referring to FIG. 4); the pipe joint 43 has a radial hole 432, so that the bubble water pipe 31 enters the pipe joint 43 and the inlet 41 of the air pipe 4 through the radial hole 432; and the bubble water pipe 31 extends outwardly to be far away from the main machine 1 along the interior of the flexible air pipe 4, and is connected to pipe joints 35, 36 that may be attached or detached, and a support member 37, so as to be connected to, at a tail end, a bubble head 33 containing a plurality of micropores.

The sprayer 5 includes a sprayer body 51 having an inner channel 52 and a thread 511; referring to FIG. 6 to FIG. 11, an air inlet 521 (referring to FIG. 7) at one end of the channel 52 of the sprayer body 51 is connected to the outlet 42 of the air pipe 4; one end of the channel 52 of the sprayer body 51 may be provided with a male connector 55, the outlet 42 of the air pipe 4 is provided with a female connector 45, and the female connector 45 may be socketed into, attached to, or detached from the male connector 55; an annular groove 551 is provided at an outer periphery of the male connector 55; either side of the female connector 45 is connected to a clamping handle 46; and each clamping handle 46 is provided with a protruded portion 461 that can abut against the annular groove 551. The other end of the sprayer body 51 is provided with an air outlet pipe 53 and a plurality of spaced air outlet holes 531 at an outer circumference of the air outlet pipe 53; a tail end of the air outlet pipe 53 is sleeved with a cloth sleeve 54 extending outwardly and a girding belt 541 for positioning; and the bubble head 33 of the bubble water pipe 31 is disposed in the air outlet pipe 53. An external side of the sprayer body 51 is connected to a fixation rack 57 having a fixation hole 571; the other end of the sprayer body 51 may be connected to a spray pipe 56 having an inner pipe 561 and a thread 564 (referring to FIG. 10), so as to be in communication with the air outlet holes 531 of the corresponding channel 52 of the sprayer body 51; the air outlet pipe 53 and the cloth sleeve 54 extend into the pipe 561; the inner diameter of the pipe 561 of the spray pipe 56 is greater than that of the air outlet pipe 53 of the sprayer body 51; an inner annular toothed edge 562 radially extending into the inner diameter of the pipe 561 is provided at a tail end of the spray pipe 56; and the inner annular toothed edge 562 has a plurality of annularly arranged and connected inner sharp teeth 563.

Figure 1:
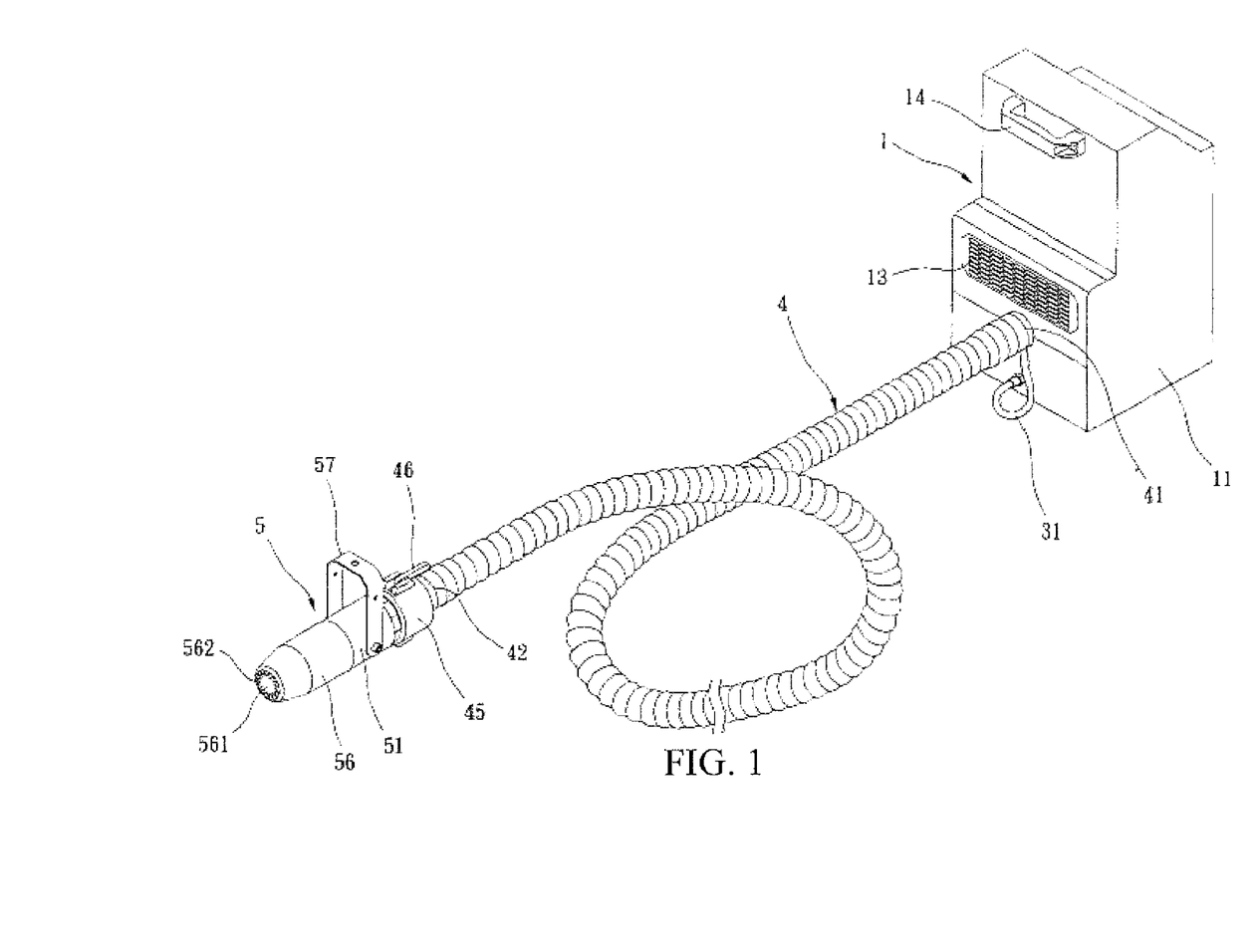
FIG. 1 is a three-dimensional diagram of a composite bubble-type snowflake maker according to an embodiment of the present invention.
Figure 2:
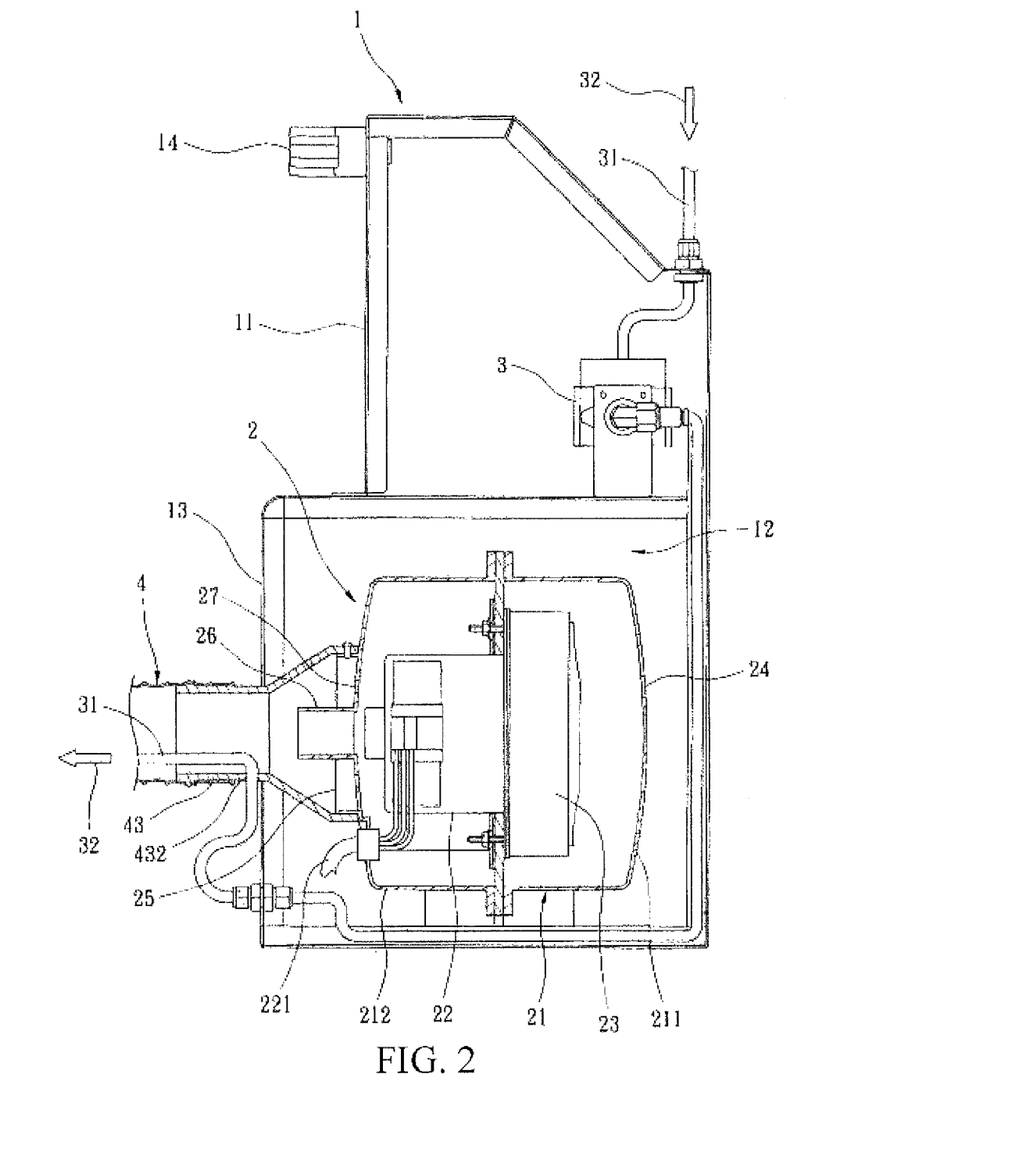
FIG. 2 is an enlarged sectional diagram of a main machine and a blower according to FIG. 1.
Figure 3:
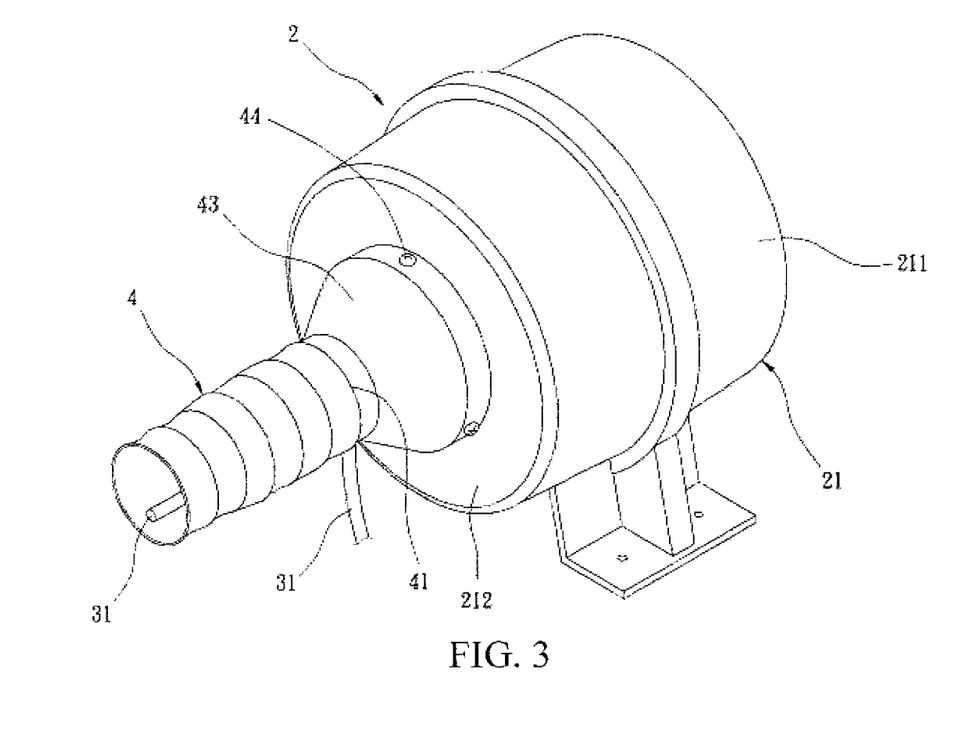
FIG. 3 is a three-dimensional partial diagram of the blower and an air pipe according to FIG. 2.
Figure 4:
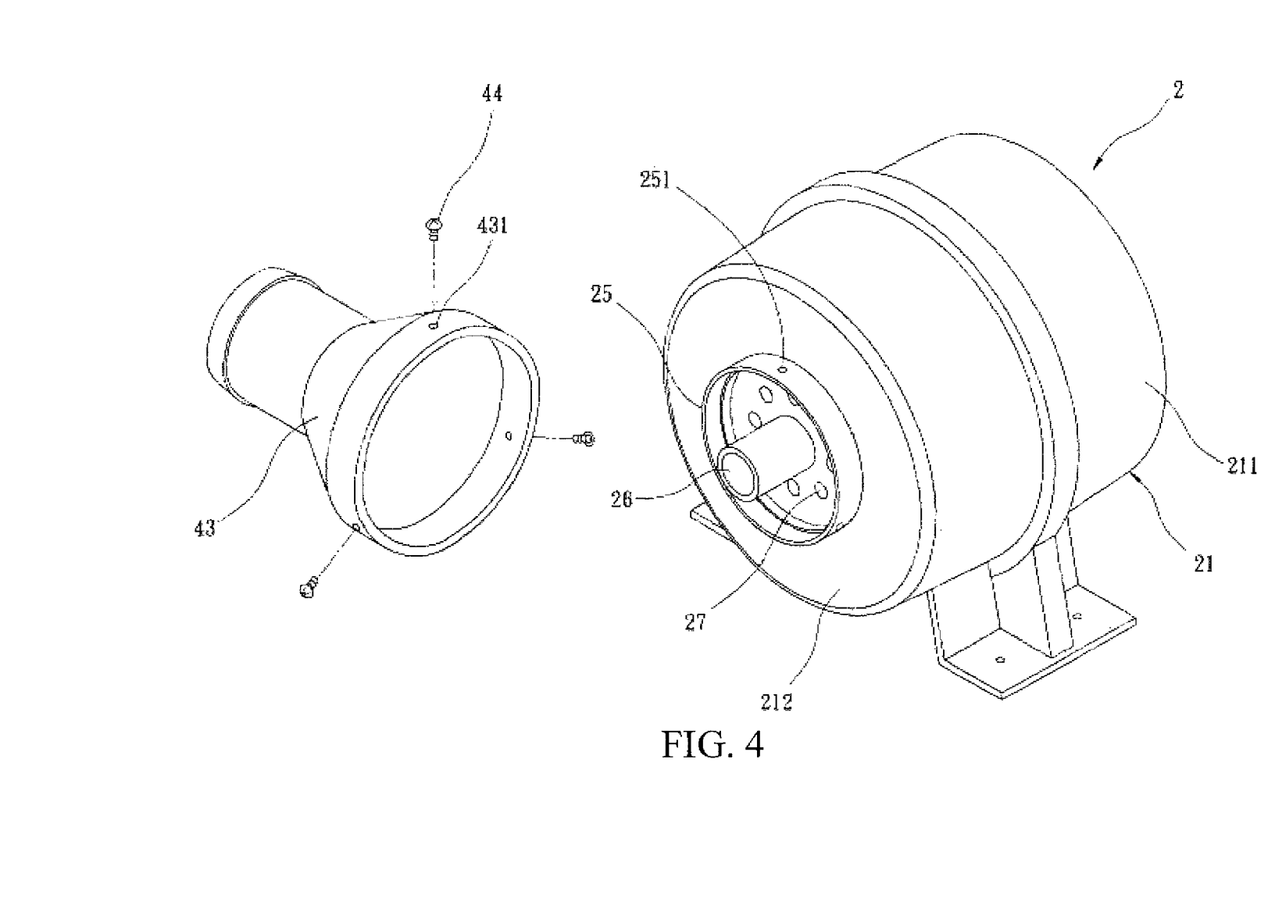
FIG. 4 is a three-dimensional exploded diagram of the blower and a pipe joint according to FIG. 2.
Figure 5:
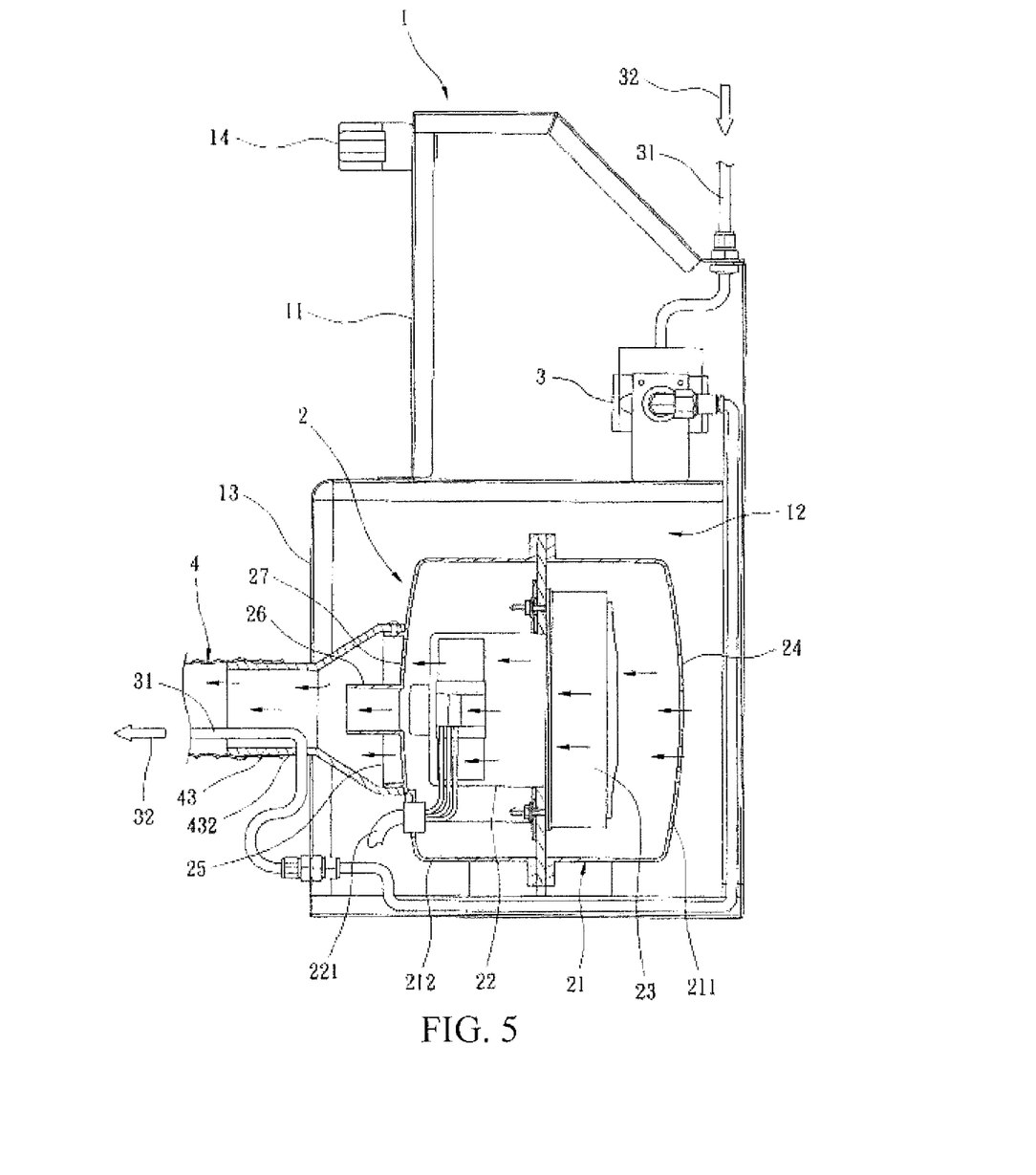
FIG. 5 is a diagram of the main machine and the blower according to FIG. 2 in use.
Figure 6:
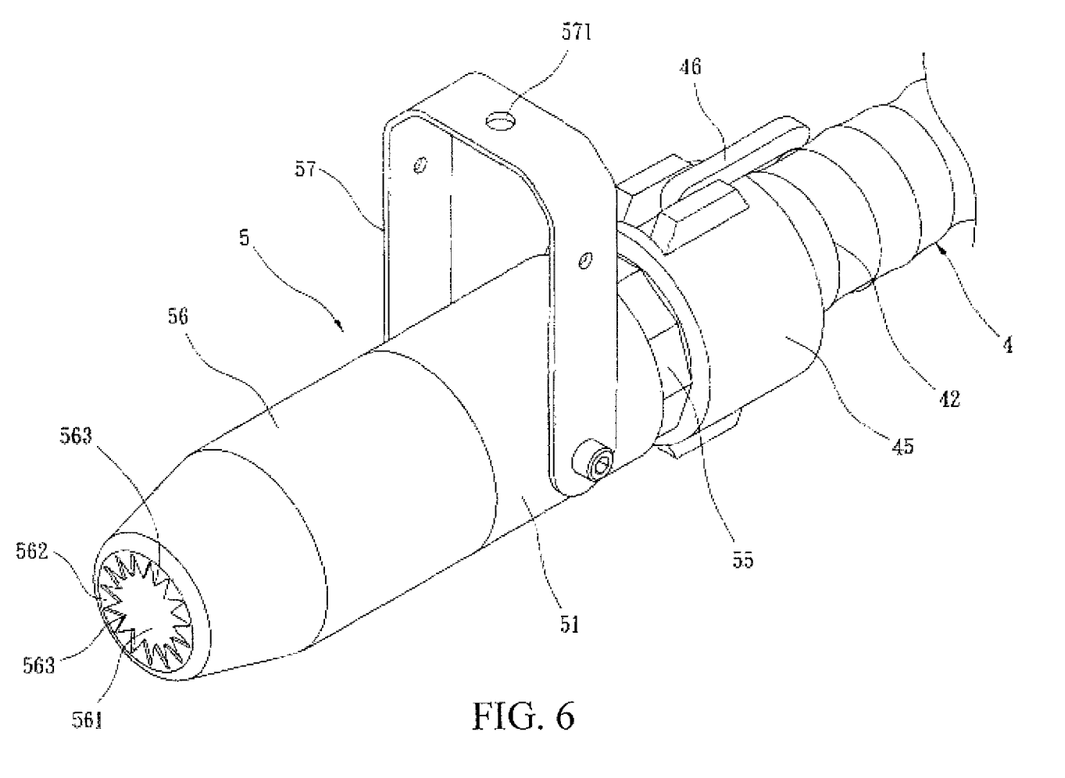
FIG. 6 is a three-dimensional diagram of a sprayer and an air pipe according to FIG. 1.
Figure 7:
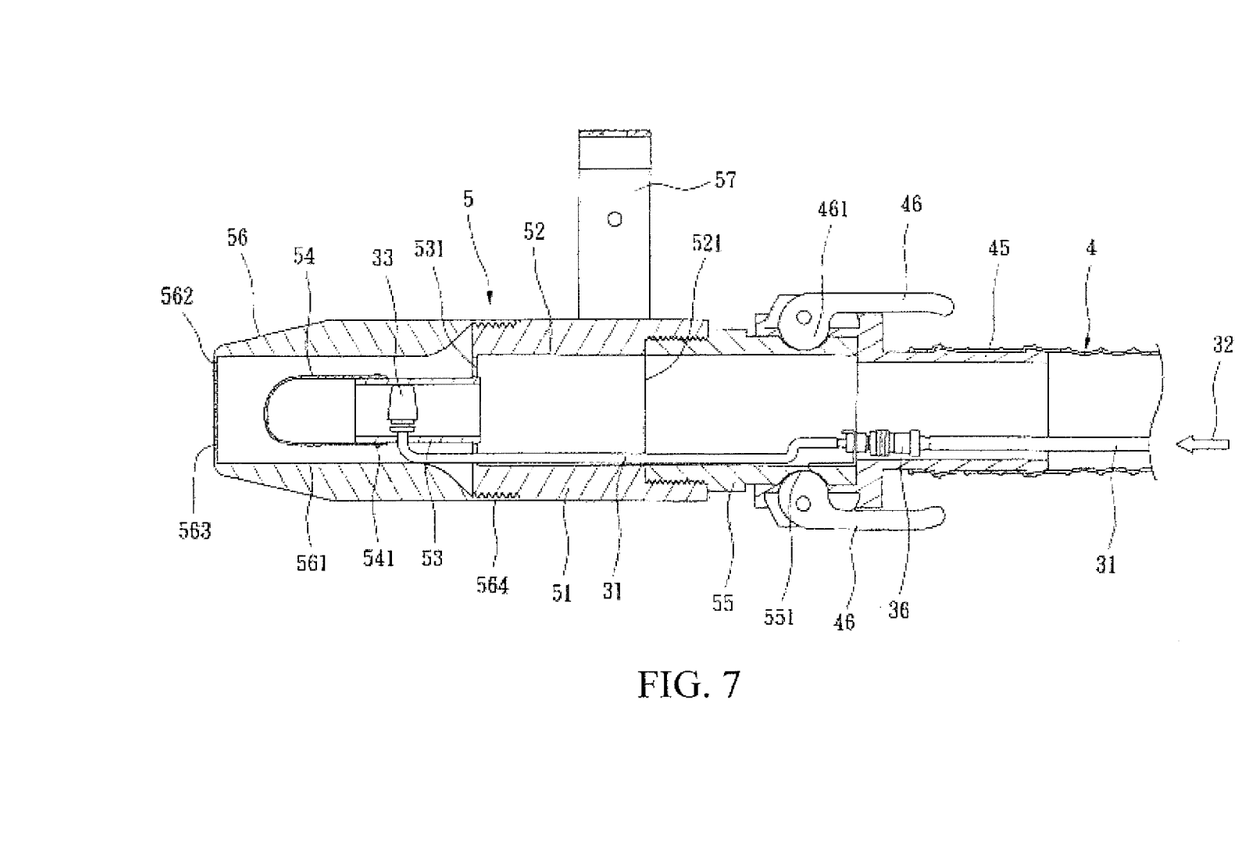
FIG. 7 is a sectional diagram according to FIG. 6.
Figure 8:
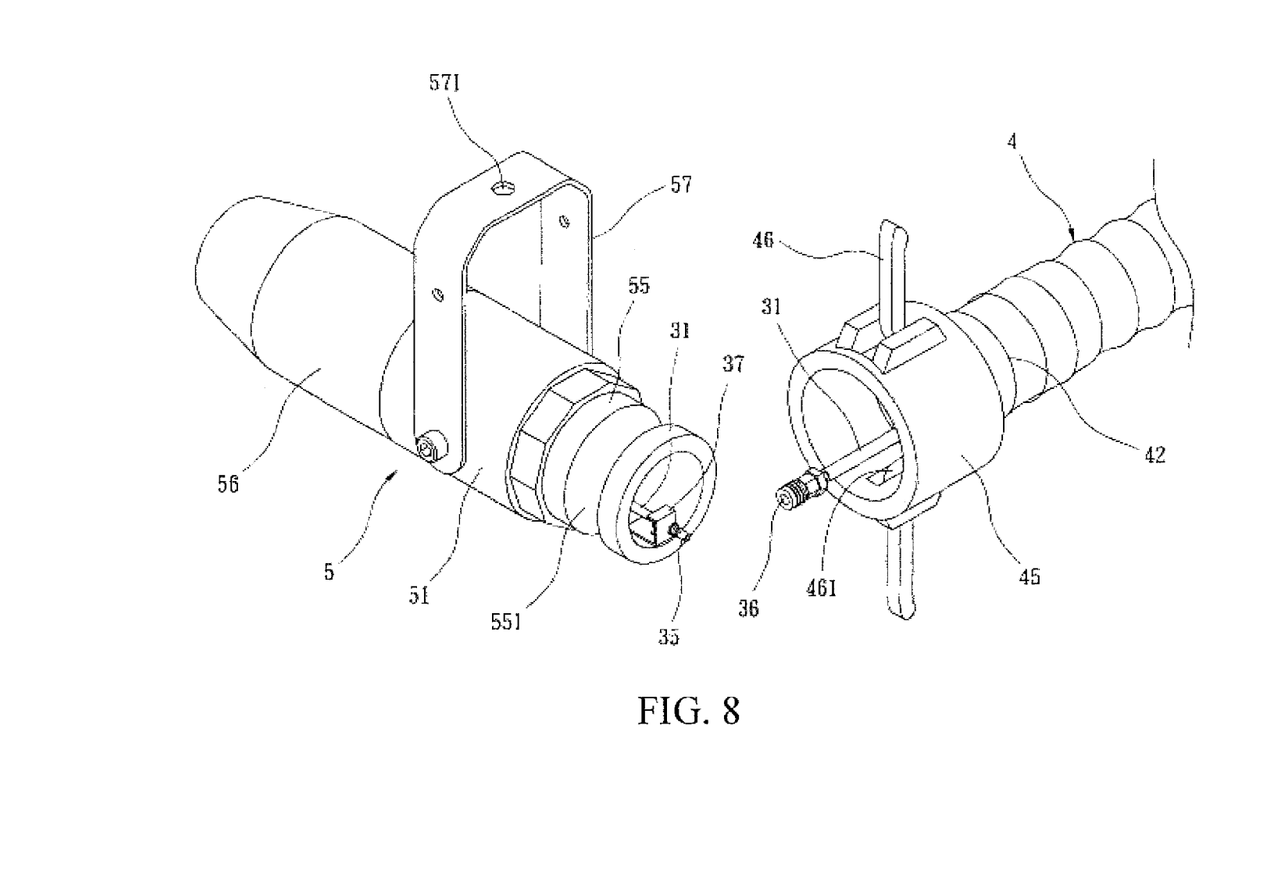
FIG. 8 is a three-dimensional exploded diagram of the sprayer and the air pipe according to FIG. 6.
Figure 9:
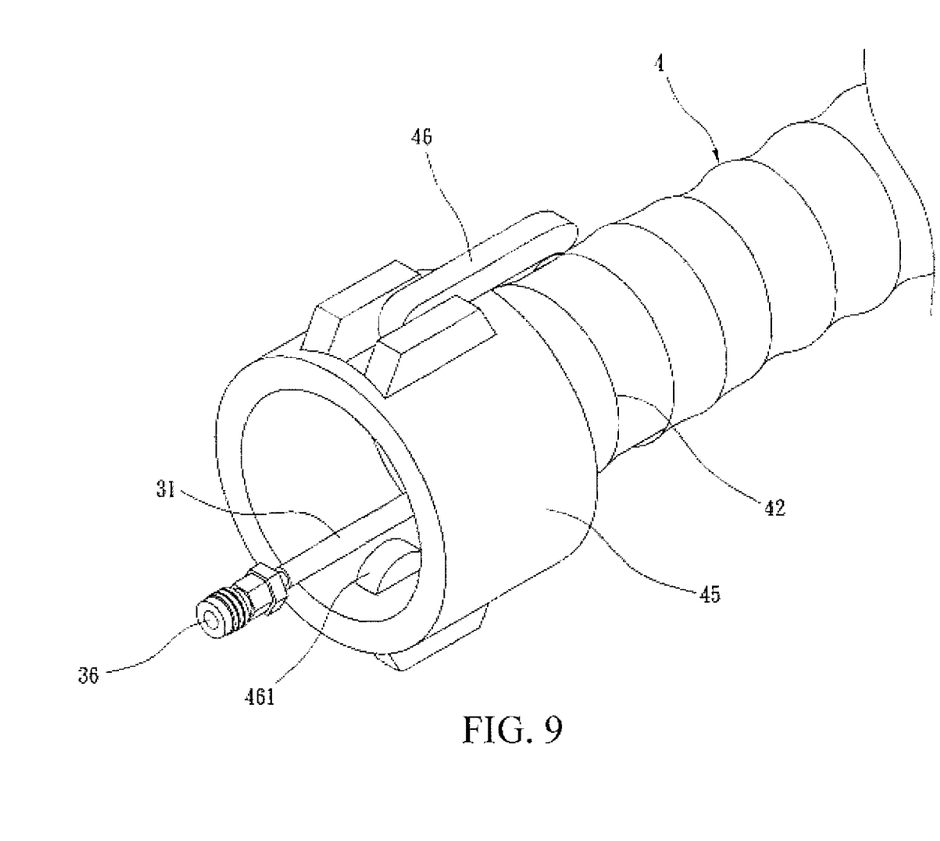
FIG. 9 is a three-dimensional diagram of the air pipe and a female connector according to FIG. 6.
Figure 10:
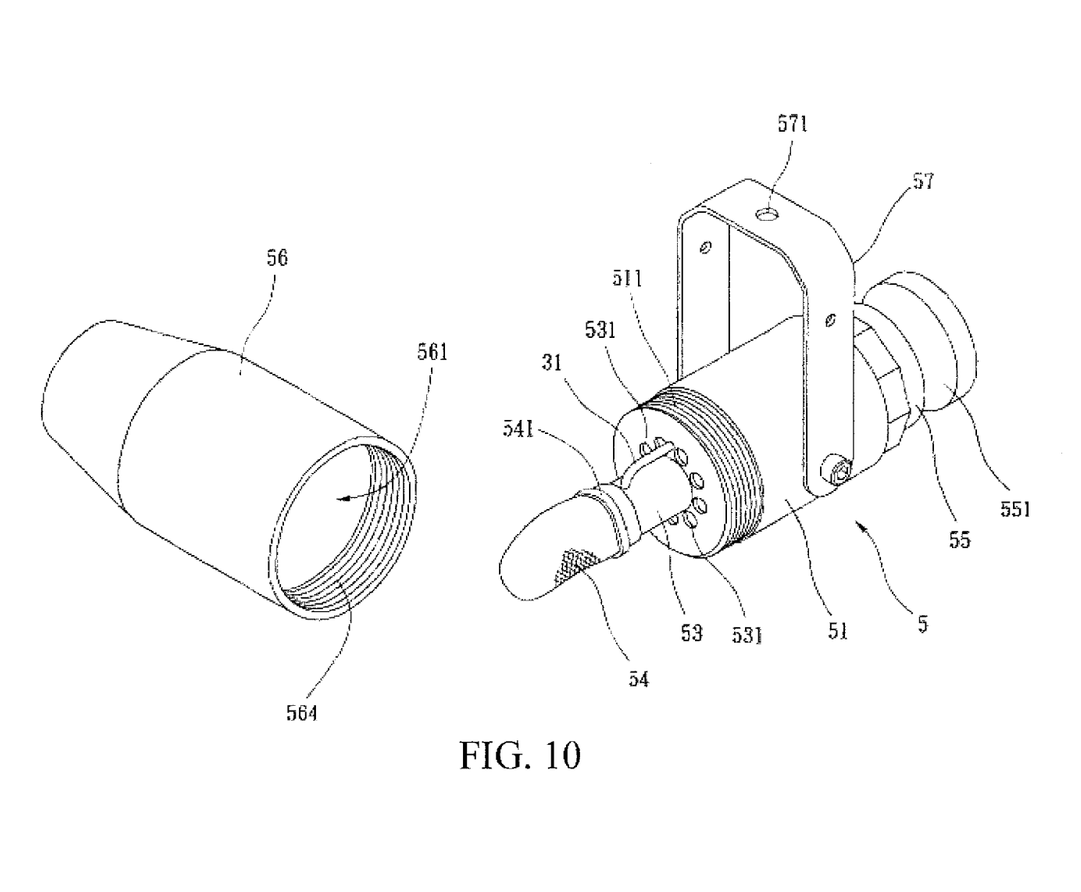
FIG. 10 is a three-dimensional exploded diagram (1) of the sprayer according to FIG. 6.
Figure 11:
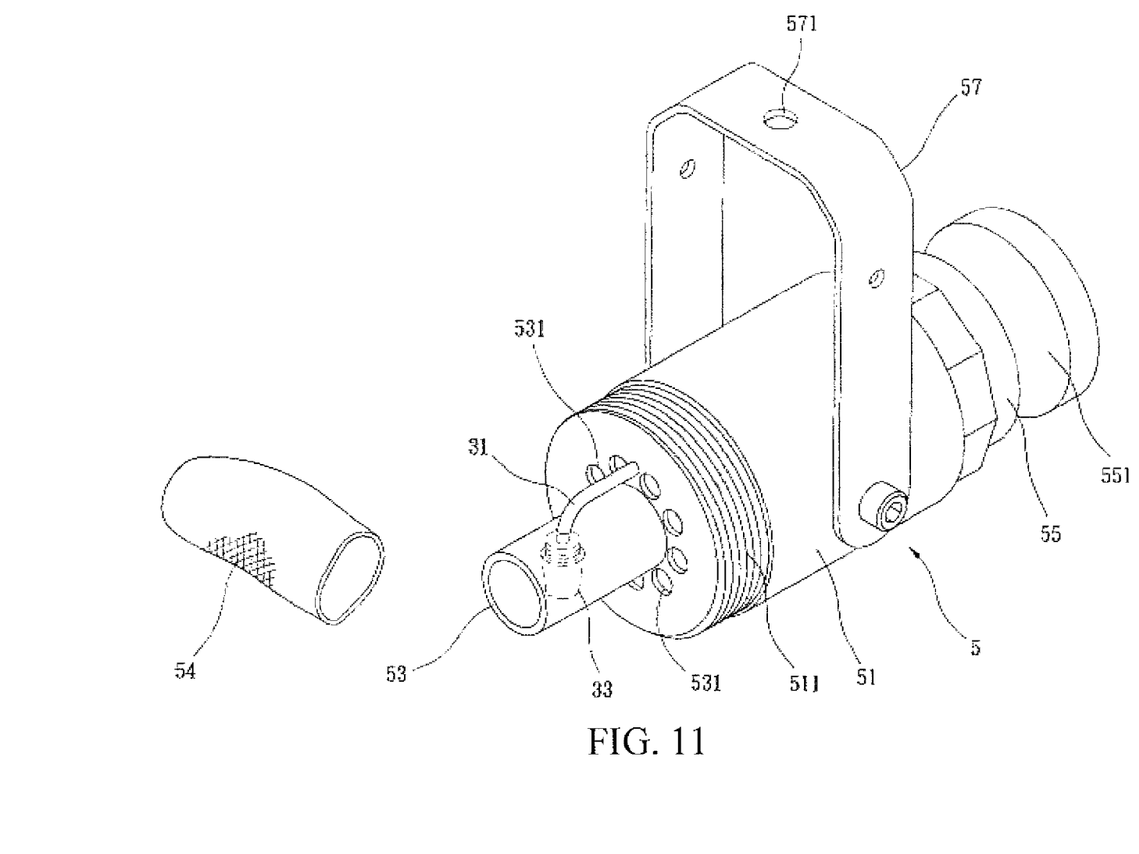
FIG. 11 is a three-dimensional exploded diagram (2) of the sprayer according to FIG. 6.
Figure 12:
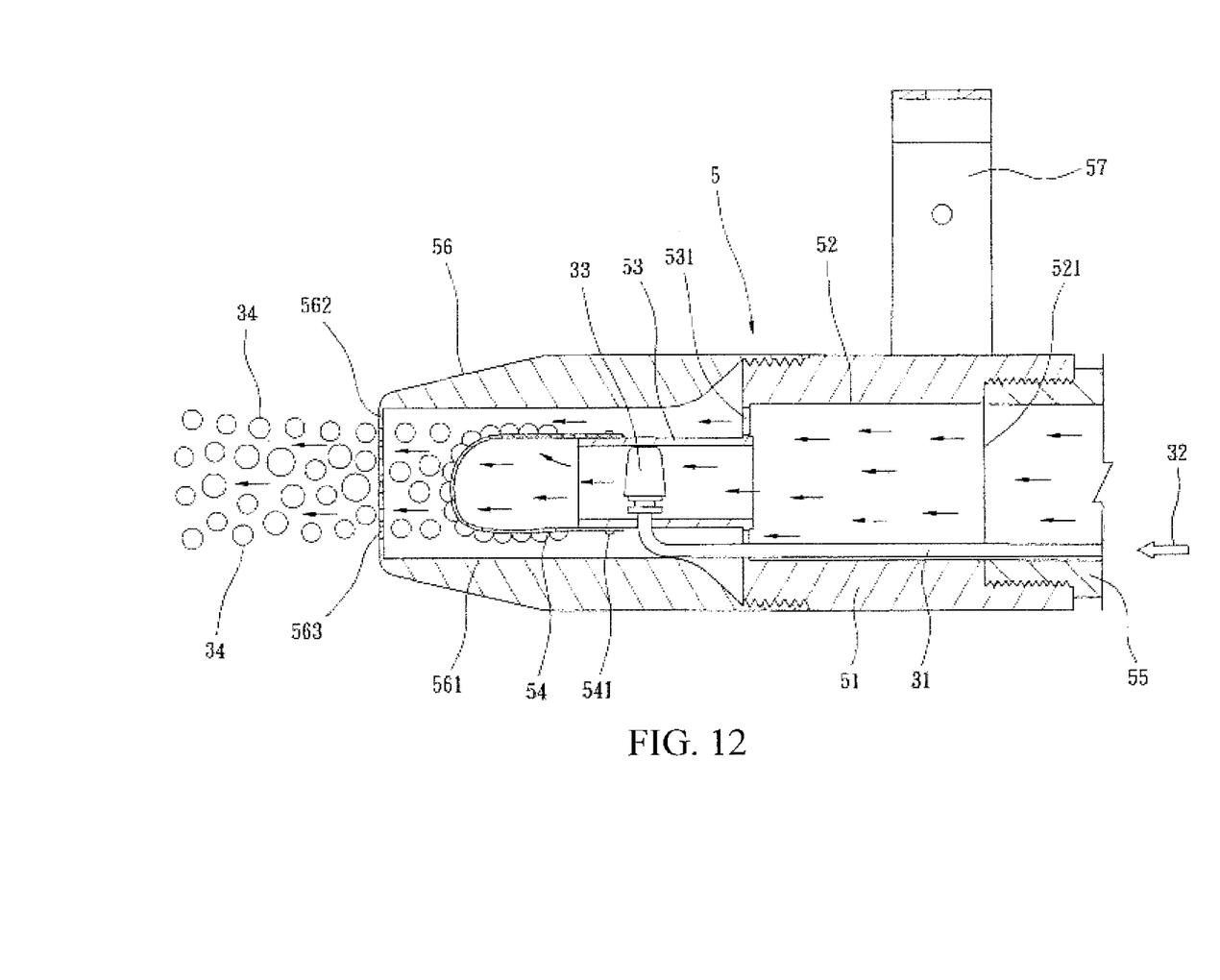
FIG. 12 is a diagram of the sprayer according to FIG. 6 in use.

Hence, the bubble-type snowflake maker of the present invention uses the air pipe 4 to connect the main machine 1 and the sprayer 5, so that the main machine 1 and the blower 2 thereof can be far away from drama and stage sites, thereby preventing noise produced by the blower 2 from affecting a stage performance effect. When the bubble-type snowflake maker is practically used, as shown in FIG. 1, FIG. 5, and FIG. 12, the bubble water 32 enters the pump 3 through the bubble water pipe 31, then is delivered, by the bubble water pipe 31, to the bubble head 33 for refining, and then enters the cloth sleeve 54; the motor 22 and the fan 23 in the blower 2 are controlled to provide wind power, so that the wind power generated by the blower 2 passes through the air pipe 4 and the channel 52 of the sprayer 5, then is blown out through the air outlet pipe 53 and the air outlet holes 531, and then is blown to the exterior and interior of the cloth sleeve 54; the wind power at the interior forces the bubble water 32 to exude from a surface of the cloth sleeve 54; and then the wind power of the air from the air outlet holes 531 annularly arranged at the outer periphery of the air outlet pipe 53 functions to enable bubbles 34 exuded from the cloth surface to fly outwardly and to be sent out through the pipe 561 of the spray pipe 56, so as to form artificial snowflakes. In addition, the inner annular toothed edge 562 and the inner sharp teeth 563 of the spray pipe 56 function to enable the bubbles 34 to be sent out in a centralized manner along a middle part of the pipe 561, so as to prevent most bubbles 34 from moving along an outer peripheral surface of the spray pipe 56 and dropping, thereby avoiding a slippery floor of a stage site.

To sum up, in order to cure the deficiencies and disadvantages of the prior art, key technologies of the present invention are that: in the bubble-type snowflake maker of the present invention, the air pipe 4 is used to connect the main machine 1 and the sprayer 5, so as to enable the main machine 1 and the blower 2 thereof to be far away from drama and stage sites and enable the sprayer 5 to be relatively far away from the main machine 1, so that the bubble-type snowflake maker is used with the drama and stage sites; the sprayer 5 is applicable to an outdoor stage; and it is easier for the main machine 1 to be far away from outdoor rain and to take a waterproof measure, so as to prevent the rain from causing a failure or a damage of the main machine 1.

The above-described embodiments are merely used for the convenience of describing the present invention, but are not intended to limit the present invention. Various simple variations and modifications made by persons killed in the art without departing from the idea and scope of the present invention shall fall within the scope of the following claims.

LIST OF REFERENCE NUMERALS

1. Main machine
11. Machine body
12. Accommodating space
13. Air inlet
14. Handle
2. Blower
21. Housing
211. Housing wall
212. Housing wall
22. Motor
221. Power cable
23. Fan
24. Air inlet hole
25. Air outlet
251. Through hole
26. Air outlet pipe
27. Air outlet hole
3. Pump
31. Bubble water pipe
32. Bubble water
33. Bubble head
34. Bubble
35. Pipe joint
36. Pipe joint
37. Support member
4. Air pipe
41. Inlet
42. Outlet
43. Pipe joint
431. Through hole
432. Radial hole
44. Screw
45. Female connector
46. Clamping handle
461. Protruded portion
5. Sprayer
51. Sprayer body
511. Thread
52. Channel
521. Air inlet
53. Air outlet pipe
531. Air outlet hole
54. Cloth sleeve
541. Girding belt
55. Male connector
551. Annular groove
56. Spray pipe
561. Pipe
562. Inner annular toothed edge
563. Inner sharp teeth
564. Thread
57. Fixation rack
571. Fixation hole

What is claimed is:

1. A composite bubble-type snowflake maker, comprising:
a main machine, the interior of a machine body of the main machine being provided with accommodating space for disposing a blower comprising a motor and a fan, so as to enable the blower to send out wind power towards an air outlet, and for disposing a pump connected to a bubble water pipe, so as to enable the pump to outwardly transport bubble water along the bubble water pipe;
an air pipe, an inlet at one end thereof being connected to the air outlet, an outlet at the other end thereof being far away from the main machine, wherein a tail end of the bubble water pipe is outwardly far away from the main machine along the air pipe, so as to be connected to a bubble head; and
a sprayer, comprising: a sprayer body having an inner channel, an air inlet at one end of the inner channel of the sprayer body being connected to the outlet of the air pipe, and the other end of the inner channel being provided with an air outlet pipe and a plurality of air outlet holes at an outer circumference of the air outlet pipe, a tail end of the air outlet pipe being sleeved with a cloth sleeve extending outwardly, and the bubble head of the bubble water pipe being disposed in the air outlet pipe.

2. The composite bubble-type snowflake maker according to claim 1, wherein the pump is disposed in the machine body of the main machine, and the bubble water pipe enters the inlet of the air pipe, so that the bubble water pipe extends into the air pipe and the channel of the sprayer body.

3. The composite bubble-type snowflake maker according to claim 2, wherein a pipe joint is provided between the air outlet of the blower and the inlet of the air pipe, and the pipe joint has a radial hole, so that the bubble water pipe enters the pipe joint and the air pipe through the radial hole.

4. The composite bubble-type snowflake maker according to claim 2, wherein one end of the channel of the sprayer body is provided with a male connector; the outlet of the air pipe is provided with a female connector; and the female connector may be socketed into, attached to, or detached from the male connector.

5. The composite bubble-type snowflake maker according to claim 4, wherein an annular groove is provided at an outer periphery of the male connector; either side of the female connector is connected to a clamping handle; and each clamping handle is provided with a protruded portion that can abut against the annular groove.

6. The composite bubble-type snowflake maker according to claim 4, wherein a pipe joint that may be attached or detached is provided at a position near the tail end of the bubble water pipe.

7. The composite bubble-type snowflake maker according to claim 1, wherein the other end of the sprayer body is connected to a spray pipe having an inner pipe, so as to be in communication with the air outlet holes of the corresponding channel of the sprayer body, and the air outlet pipe and the cloth sleeve extend into the inner pipe.

8. The composite bubble-type snowflake maker according to claim 7, the inner diameter of the spray pipe is greater than that of the air outlet pipe of the sprayer body, and an inner annular toothed edge entering the inner diameter of the spray pipe radially extends along a tail end of the spray pipe.

9. The composite bubble-type snowflake maker according to claim 8, wherein the inner annular toothed edge of the spray pipe has a plurality of annularly arranged and connected inner sharp teeth.

10. The composite bubble-type snowflake maker according to claim 1, wherein an external side of the sprayer body is connected to a fixation rack.

* * * * *